US009468140B2

(12) United States Patent
Madsen et al.

(10) Patent No.: US 9,468,140 B2
(45) Date of Patent: Oct. 18, 2016

(54) HARVESTING DEVICE (71) Applicant: CLAAS E-SYSTEMS KGAA MBH & CO KG, Guetersloh (DE)

(72) Inventors: Tommy Ertbolle Madsen, Virum (DK); Kasper Lundberg Lykkegaard, Kobenhavn S (DK); Gert Lysgaard Andersen, Alleroed (DK)

(73) Assignee: CLAAS E-Systems KGaA mbH & Co KG, Guetersloh (DE)

( * ) Notice: Subject to any disclaimer, the term of this patent is extended or adjusted under 35 U.S.C. 154(b) by 0 days.

(21) Appl. No.: 14/626,020

(22) Filed: Feb. 19, 2015

(65) Prior Publication Data
US 2015/0230393 A1    Aug. 20, 2015

(30) Foreign Application Priority Data

Feb. 20, 2014    (EP) .................................... 14155904

(51) Int. Cl.
| G06F 7/70 | (2006.01) |
| *A01B 79/00* | (2006.01) |
| *A01B 39/18* | (2006.01) |
| *A01B 39/20* | (2006.01) |
| *A01C 21/00* | (2006.01) |

(52) U.S. Cl.
CPC ............. *A01B 79/005* (2013.01); *A01B 39/18* (2013.01); *A01B 39/20* (2013.01); *A01C 21/00* (2013.01)

(58) Field of Classification Search
CPC .... A01B 79/005; A01B 39/18; A01B 39/20; A01B 79/00; A01B 49/06; A01C 21/00; A01C 21/005; A01C 21/002; A01M 9/0012

USPC .................. 701/50; 700/231; 222/1, 52, 636
See application file for complete search history.

(56) References Cited

U.S. PATENT DOCUMENTS

| 5,694,751 | A | * | 12/1997 | Behnke | .............. | A01D 41/1278 |
| | | | | | | 56/10.2 F |
| 5,956,255 | A | * | 9/1999 | Flamme | ............... | A01B 79/005 |
| | | | | | | 111/903 |
| 2002/0091458 | A1 | * | 7/2002 | Moore | ................. | A01D 41/127 |
| | | | | | | 700/110 |
| 2004/0189512 | A1 | * | 9/2004 | Takashima | ............ | G01S 13/867 |
| | | | | | | 342/70 |
| 2007/0001097 | A1 | * | 1/2007 | Wei | ...................... | A01B 69/008 |
| | | | | | | 250/208.1 |
| 2009/0037059 | A1 | * | 2/2009 | Huster | ................. | A01B 69/001 |
| | | | | | | 701/50 |

(Continued)

FOREIGN PATENT DOCUMENTS

| EP | 2 342 963 | | 7/2011 | | |
| EP | 2441320 | A1 | * 4/2012 | ........... | A01B 69/008 |

*Primary Examiner* — Shardul Patel
(74) *Attorney, Agent, or Firm* — Michael J. Striker (57) ABSTRACT An agricultural machine with an implement for working a row culture of working rows arranged parallel to one another, interference rows arranged at an angle to the working rows or both includes at least one controllably moveably working section with activatable working devices for working the row culture. The implement has a control unit for controlling the working section and working device relative to a working row and an optical sensor unit connected to the control unit for generating an image of at least part of the row culture, from which a sensor signal (S) is generated for controlling the controllably working section, working device or both. The control unit evaluates a validity of the sensor signal (S) to determine whether the sensor signal (S) is used for controlling the working section or working device based on at least one evaluation parameter.

13 Claims, 5 Drawing Sheets (56) References Cited

U.S. PATENT DOCUMENTS

2011/0172811 A1* 7/2011 Chinkiwsky ......... A01B 79/005
  700/231

2012/0200706 A1* 8/2012 Greenwood .............. B60R 1/00
  348/148
2014/0263409 A1* 9/2014 Wagers .................. B65G 53/40
  222/1

* cited by examiner

HARVESTING DEVICE

CROSS-REFERENCE TO A RELATED APPLICATION

The invention described and claimed hereinbelow is also described in European Patent Application EP 14155904.7, filed on Feb. 20, 2014. The European Patent Application, the subject matters of which is incorporated herein by reference, provides the basis for a claim of priority of invention under 35 U.S.C. 119(a)-(d).

BACKGROUND OF THE INVENTION

The present invention relates to an agricultural machine with a controllably moveable implement for working row cultures and to a method for controlling an agricultural machine with an implement having at least one controllably moveable section.

Agricultural machines for working row cultures usually comprise an implement, which is arranged transversely to a travelling direction or a longitudinal axis of the machine and a plurality of working devices for working the plants of the row culture arranged in rows. The working devices can be equipped for mechanically or contactlessly working the row culture, for example, for outputting fertilizer or pesticides. The agricultural machines in this case frequently have a section control, in which the working devices are activated individually or in groups, so that with overlapping working strips, plant rows or individual plants of the row culture are each worked only once in order to avoid, for example, over-fertilizing or mechanically damaging the row culture.

Controlling the section shutoff is effected manually by an operator of the agricultural machine or automatically, for example, through a control unit that is coupled in particular to a navigation system. For improving the working of the row culture, a section control of the implement is generally provided in which working devices combined into sections are moveable transversely to the travelling direction of the machine so that the working devices can be better guided along the plants of the row culture.

EP 2 342 963 A1 discloses a method and a machine for outputting an input, for example, seeds or pesticides, on an agricultural field, wherein a plurality of input dispensers for outputting the input are provided. The machine has a section control in which the input dispensers are designed switchable individually or in groups. Controlling the sections and/or the input dispensers is effected by a control system, wherein the machine furthermore comprises an automated, GPS-based locating and steering system, in order to avoid double outputting of the input on the surfaces which are passed by the machine twice. Here, during the first pass of the area, the corresponding input dispensers are deactivated, so that the input is only output on the area concerned upon the second pass in order to minimise or avoid interfering with the already output input during a second pass. Through the automated section control, the handling of the implement is facilitated for the operator and the precision of the output increased, but the operator is not supported in controlling the working devices along the plant rows of the row culture.

SUMMARY OF THE INVENTION

The present invention overcomes the shortcomings of known arts, such as those mentioned above.

To that end, the present invention provides an agricultural machine and a method, which make possible an improvement of the control of a working section and/or working device of an implement of an agricultural machine in the working of a row culture, in particular, in a region of irregularly arranged rows of plants.

An agricultural machine according to the invention comprises an implement for working a row culture, wherein the row culture substantially comprises working rows arranged parallel to one another and/or interference rows arranged at an angle to the working rows. The implement comprises at least one controllably moveable working section with at least one activatable working device for working the row culture, a control unit for controlling the at least one working section and/or working device relative to at least one working row, and at least one optical sensor unit connected to the control unit for generating an image of at least one part of the row culture. Based on the image of the row culture, a sensor signal for controlling the working section and/or working device is generated. The control device is equipped and designed in such a manner as to evaluate a validity of the sensor signal for controlling the at least one working section and/or working device based on at least one evaluation parameter.

With the validity, the control unit valuates the extent to which a sensor signal is utilizable for a reliable control of the working section and/or of the working device. Validity of the sensor signal in this case is to mean the validity or accuracy of the sensor signal. Evaluation parameters for evaluating the validity of the sensor signal are parameters such as exert an influence on the validity or accuracy of the sensor signal. The optical detection of the row culture with an optical sensor unit makes possible a highly precise guiding of the implement and/or of the working devices along at least one row culture. The evaluation of the validity of the sensor signal has the advantage that an interfering influence of an interference row on the control is reduced, as a result of which the control of the working section and/or working device in the working of a row culture is improved.

An agricultural machine, for example, a tractor or a self-propelled pesticide sprayer, comprises an implement that substantially extends transversely to the travelling direction and/or a longitudinal axis of the machine. The implement in this case can span a plurality or rows of the row culture to be worked, wherein the plants are arranged in working rows and/or interference rows. The working rows are substantially arranged parallel to the travelling direction and/or longitudinal direction of the machine and are the plant rows to be worked at that time. Here, the plants of the working rows, can be worked for example with pesticide, and/or the soil between the working rows, can be worked for example with an implement in the form of a mechanical hoe for the mechanical weeding in row cultures. Interference rows are arranged at an angle to the working rows, for example, the plant rows arranged in a headland and cannot be worked in the same operation as the working rows without being worked twice or damaged in the process.

During the working of the plant rows in the headland, the plant rows in the headland to be processed then constitute the working rows and the plant rows which are arranged at an angle thereto constitute the interference rows. The implement comprises at least one controllably moveable working section, wherein on the working section at least one working device for working the plants in the working rows and/or the soil between the working rows can be arranged. Moving the working section is effected through a control unit substantially controlled perpendicularly to the travelling direction and/or longitudinal axis of the machine, as a result of which a guidance of the at least one working devices along a working row is improved. The control of the working section and/or working device takes place based on a sensor signal, for the generation of which an optical sensor unit, which is connected to the control unit, generates an image of at least one part of the row culture.

The sensor signal is generated through the optical sensor unit and/or through the control unit. The sensor signal can for example contain information obtained through image evaluation with respect to the arrangement, in particular the working rows and interference rows of the row culture. The sensor signals are utilizable by the control unit for controlling the working section and/or working device. The control unit is connected to the optical sensor unit and further sensor units, for example a navigation system and/or an automatic steering system, the signals of which are likewise utilizable by the control unit for controlling the working section and/or the working device. By use of the control signal, the control unit precisely controls the working section and/or working device in the case of a machine moving in travelling direction relative to the working rows detected through the image.

Here, the control unit evaluates a validity of the sensor signal for controlling the at least one working section and/or working device with the help of at least one evaluation parameter. With the validity, the control unit evaluates the extent to which the sensor signal is utilizable for a reliable control of the working section and/or the working device. The validity of the sensor signal in this case is to mean the validity or accuracy of the sensor signal. In the case of an evaluation of the sensor signal, which produces for example a high validity of the sensor signal, the control unit controls the working section and/or the working device along a working row based on the sensor signal. For a sensor signal with a low validity, the control unit takes into account the sensor signal to a lesser degree and takes into account further signals, for example, from a navigation system, to a greater degree.

If the evaluation produces a very low validity of the sensor signal, the sensor signal can be entirely neglected and/or the optical sensor unit deactivated. Evaluation parameters for evaluating the validity of the sensor signal can be such parameters as exert an influence on the validity or accuracy of the sensor signal, for example, row culture-based and/or working machine-based parameters, the light conditions under which the optical sensor unit generates the image, an adequate optical contrast between the row culture and the soil, gaps in the plant rows, the size of the spacings between the working rows, and the spatial arrangement of the working rows.

In one configuration, the evaluation parameters are a distance between the at least one optical sensor unit and at least one interference row and/or at least one end of a working row. The evaluation parameter can be the distance between the optical sensor unit and an end of a working row, wherein the distance between the optical sensor unit and an end of each working row is determinable in the field of view of the optical sensor unit. The distance to the optical sensor unit in this case corresponds to the distance to the working section and/or the working device.

Furthermore, the evaluation parameter can be the distance between the optical sensor unit and at least one interference row, wherein the interference row is arranged at an angle to a working row and intersects the working row or working rows, for example, at a headland, wherein the working rows can each end at the interference row. Here, the distance between the optical sensor unit and the interference row located next to the sensor unit corresponds to the distance between the sensor unit and the end of the respective working row. Because the distance between the optical sensor unit and an end of a working row and/or an interference row is taken into account as evaluation parameter in the evaluation of the validity of the sensor signal, wrongly activating the working section and/or working device can be avoided.

In the case of an increasing number of interference rows in the field of view of the optical sensor unit, the interference rows because of their oblique arrangement to the working rows can lead to a distorted control signal, which in turn can lead to a defective activation of the working section and/or working device, since the control unit could attempt to align the working section and/or working device parallel to the interference rows, as a result of which the working rows which are still to be worked could be effectively worked or destroyed. By taking into account the distance, the validity of the sensor signal with decreasing distance to an interference row or an end of a working row can be lowered in order to compensate for an increase of detected interference rows or missing rows, as at an end of a working row. It is particularly advantageous that by doing so the control is improved in regions of irregularly arranged plant rows, for example, interference rows of a headland.

In a configuration, a limited distance between the optical sensor unit and at least one interference row and/or an end of a working row is adjustable for evaluating the sensor signal. Through the adjustable limit distance, a certain distance is predetermined in the case of which the validity of the sensor signal is significantly lowered or the sensor signal is disregarded by the control unit for the further control of the working section and/or working device. This has the advantage that the evaluation of the sensor signal through the control unit is simplified.

Advantageously, a part region of the image of the row culture, in particular, a distance-dependent one, is evaluated through the control unit. For evaluating a part region of the image of the row culture, the sensor signal is generated based on the part region to be evaluated or merely the part of the sensor signal which corresponds to the part region to be considered to be utilized for the evaluation. In the case of an adjusted limit distance, only a part region of the image which is arranged on the sensor side of the limit region is considered, for example, by the sensor unit and/or the control unit.

In one configuration of the invention, the machine comprises a navigation system connected to the control unit, wherein the distance between the optical sensor unit and at least one interference row and/or the end of at least one working row can be determined by means of the navigation system. The navigation system can for example be a satellite-supported navigation system for determining the current position of the agricultural machine, an optical sensor unit and/or the working device. The navigation system can be employed for activating the at least one working device, for example by providing current and/or stored position signals to the control unit for the position-dependent activation of the working devices. In the navigation system, data for row cultures can be stored, for example the spatial arrangement of working rows and interference rows, as well as the positions of the ends of the working rows. Through the navigation system, the distance between the optical sensor unit and an interference row and/or the end of a working row can be determined in a particularly simple manner.

In one configuration, the distance between the optical sensor unit and at least one interference row and/or the end of at least one working row is determined by the optical sensor unit. An optical sensor unit that is present for controlling the working section and/or working device is employed particularly cost-effectively for determining the distance, for example, by an image evaluation for detecting an interference row and/or an end of a working row.

In one configuration, at least one second optical sensor unit for creating a second image is provided, wherein based on the second image a second sensor signal is generated, and the evaluated, sensor signals are utilized individually or in combination for controlling the at least one working section and/or working device. The second image detects at least one part of the row culture. The first image and the second image detect different, partly different or the same part of the row culture. Through the second image, a second sensor signal for controlling the at least one working section and/or working device is provided through the optical sensor unit and/or the control unit.

Advantageously, the first and the second evaluated sensor signals are jointly utilised for the control. Here, the sensor signals are evaluated differently and are incorporated in the control of the at least one working section and/or working device corresponding to their respective evaluation. Here, a sensor signal with low validity is disregarded, so that the control is based on the second sensor signal. For example, the first sensor signal is evaluated with a low validity because of an interference row, while the second sensor signal is evaluated with a very high validity, so that the control of the at least one working section and/or working device by a sensor signal is predominantly or exclusively based on the second sensor signal. Because of this, a sensor signal of low validity is compensated for, as a result of which a reliable control is ensured for longer.

Furthermore, the invention relates to a method for controlling a working section and/or working device of an implement of an agricultural machine for working a row culture, wherein the row culture comprises working rows substantially arranged parallel to one another and/or interference rows arranged at an angle to the working rows, and wherein the implement comprises at least one controllably moveably working section with at least one activatable working device for working the row culture, a control unit for controlling the at least one working section and/or working device relative to at least one working row, and at least one optical sensor unit connected to the control unit for generating an image of at least one part of the row culture, wherein based on the image of the row culture a sensor signal for controlling the working section and/or working device is generated.

According to the invention, the control unit evaluates the sensor signal for controlling the at least one working section and/or working device based on at least one evaluation parameter. The optical detecting of the row culture makes possible a highly precise guiding of the working machine and/or of the implement along at least one row culture. The evaluation of the validity of the sensor signal makes possible a further improvement of the control of the working section and/or working device during the working of a row culture.

In a development, the sensor signal is evaluated based on a distance between the at least one optical sensor unit and at least one interference row and/or at least one end of a working row. By detecting the distance between the at least one optical sensor unit and at least one interference row and/or an end of a working row, the validity of the sensor signal is lowered with decreasing distance to an interference row or an end of a working row in order to compensate for a rise of detected interference rows or missing rows, as at an end of a working row. Because of this, the control is improved in regions of irregularly arranged plant rows, for example, at a headland.

In a configuration, a limit distance between the optical sensor unit and at least one interference row and/or an end of a working row is adjusted for evaluating the sensor signal. Through the adjustable limit distance, a certain distance is predetermined at which for example the validity of the sensor signal is significantly lowered or the sensor signal is disregarded by the control unit for the further control of the working section and/or working device. This has the advantage that the evaluation of the sensor signal through the control unit can be simplified.

Preferentially, a distance-dependent, part region of the image of the row culture is evaluated through the control unit. In the case of an adjusted limit distance, only a part region of the image which is arranged on the sensor side of the limit region is taken into account by the sensor unit and/or the control unit.

Also, the distance between the optical sensor unit and an interference row and/or the end of at least one working row can be determined by a navigation system and/or an optical sensor unit. Through the navigation system, the distance between the optical sensor unit and an interference row and/or the end of a working row is determined in a particularly simple manner. An optical sensor unit that is present for controlling the working section and/or working device is particularly cost-effectively employed for determining the distance, for example, by an image evaluation for detecting an interference row and/or an end of a working row.

In one configuration, at least one second optical sensor unit is provided for generating a second image, wherein based on the second image a second sensor signal is generated and the evaluated, sensor signals are utilized individually and/or in combination for controlling the at least one working section and/or working device. Through the second optical sensor unit and the second sensor signal, the detected field of view of the optical sensor units is enlarged, as a result of which the accuracy of the control is improved and a sensor signal of low validity is compensated by a further, a second, sensor signal, as a result of which a reliable control can be ensured for longer.

BRIEF DESCRIPTION OF THE DRAWINGS

Further features and advantages of the invention will become apparent from the description of embodiments that follows, with reference to the attached figures, wherein.

DETAILED DESCRIPTION OF THE PREFERRED EMBODIMENTS

The following is a detailed description of example embodiments of the invention depicted in the accompanying drawings. The example embodiments are presented in such detail as to clearly communicate the invention and are designed to make such embodiments obvious to a person of ordinary skill in the art. However, the amount of detail offered is not intended to limit the anticipated variations of embodiments; on the contrary, the intention is to cover all modifications, equivalents, and alternatives falling within the spirit and scope of the present invention, as defined by the appended claims.

Figure 1:
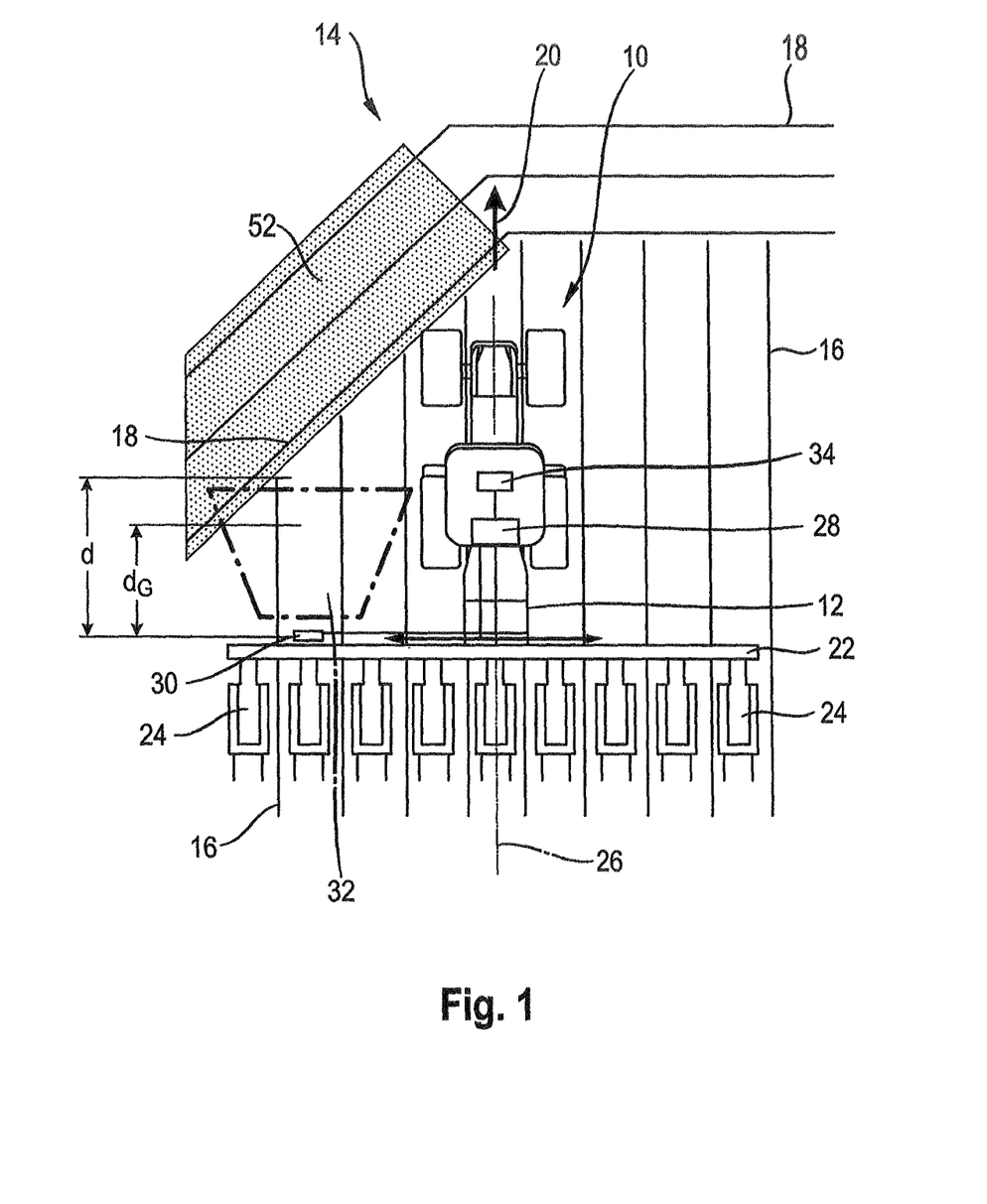
FIG. 1: presents a schematic top view of an agricultural machine with an implement having a moveable working section and an optical sensor unit.

FIG. 1 depicts an agricultural machine 10 in the form of a tractor with an implement 12 in a top view during the working or a row culture 14. The implement 12 is arranged at the rear end of the agricultural machine 10. An agricultural machine 10 can be, for example, a self-propelled sprayer, which outputs pesticide with its implement 12. The row culture 14 is arranged in working rows 16 and interference rows 18.

The working rows 16 represent the rows of the row culture, which are worked by the agricultural machine 10 and the implement 12; the working rows 16 are substantially arranged parallel to one another. The working rows 16 are the rows of the row culture, which during the working are substantially arranged parallel to a travelling direction 20 of the agricultural machine 10.

The interference rows 18 are arranged at an angle to the working rows 16, for example, in the region of a headland, as a result of which the implement 12 on reaching the interference rows 18 and/or at each end of a working row 16 has to be brought out of engagement in order to avoid damaging the plants in the interference rows 18. When working the plants in the headland, these rows are the working rows 16, since they are than substantially arranged parallel to the travelling direction 20 of the agricultural machine 10.

Working the row culture 14, the working rows 16, for example, can be effected by a sowing machine, or as shown in FIG. 1, by the implement 12 in the form of a mechanical hoe for the mechanical weeding between the working rows 16 of the row culture 14. The shown implement 12 comprises a controllably moveable working section 22, on which a multiplicity of working devices 24, for example, duckfoot shares and/or disc shares for mechanical soil cultivation are arranged. The number of working devices 24 is dependent on the width of the implement 12 and/or of the working section 22 as well as the working rows 16 to be worked simultaneously and/or intermediate spaces between the working rows 16. The working devices 24 are activatable or deactivatable individually or in groups, for example for each working section.

An activated working device 24 in this case is arranged for working the row culture and/or activatable, a deactivated working device 24 is not utilisable for working the row culture 14. During mechanical soil cultivating, for example, a deactivated working device 24 is pivoted in such a manner that the working devices 24 have no contact with the row culture 14 or the soil. The working section 22 is moved transversely to a longitudinal axis 26 and/or the travelling direction 20 of the agricultural machine 10, as a result of which an improved orientation of the working section and/or of the working devices relative to the working rows 16 is achieved.

The agricultural working machine 10 comprises a control unit 28 for controlling the movement of the working section 22 relative to at least one working row 16. The control unit 28 likewise controls the working devices 24, in particular, the activation, deactivation as well as a pivoting of the working devices 24. The control unit 28 is connected to an optical sensor unit 30, which is arranged on the implement 12 on the working section 22. The control unit 28 alternatively can be integrated in an optical sensor unit 30. The optical sensor unit 30 can be a digital camera, for example, a 3D digital camera.

The optical sensor unit 30 detects a part region of the row culture 14 in a field of view 32, in particular, in travelling direction 20. The optical sensor unit 30 generates an image of the detected part region of the row culture 14. The field of view 32 of the optical sensor unit 30 is typically orientated looking ahead in travelling direction 20 of the agricultural machine 10 and detects a region in travelling direction in front of the actual working section 22. The generated image is processed by using image detection, wherein a spatial orientation of the row culture 14, in particular, of the working rows 16 and possibly present interference rows 18, is detected. Based on the image of the part region of the row culture 14, a sensor signal S for controlling the working section 22 and/or working devices 24 is generated by the optical sensor unit 30 and/or the control unit 28. Because of this, an optical control of the working section 22 along at least one working row 16 is ensured, wherein the working section 22 is precisely guided along the actual position of the working row 16.

When the agricultural machine 10 with the implement 12 approaches an interference row 18, for example, in the region of a headland, the interference row 18 (which is arranged at an angle to the working rows 16 to be worked, as shown) increasingly enters the field of view 32 of the optical sensor unit 30. Through the arrangement of the interference row 18 (which is not parallel to the working rows 16), the sensor signal S, which is generated based on the image of the field of view 32 of the optical sensor unit 30, leads to a defective control of the working section 22 and/or of the working devices 24, since the control unit 28 can attempt to move the working section 22 corresponding to the orientation of the interference rows 18, where damage of the working rows 16 can occur. Likewise, when the agricultural machine 10 with the implement 12 approaches one or a plurality of ends of the working rows 16, without interference rows 18, the generated sensor signal S can lead to an unfavourable control of the working section 22 and/or working device 24, since in travelling direction 20 beyond the end of the working rows 16 no optical orientation points for generating a reliable sensor signal S are present.

To improve the control of the working section 22 and/or working device 24, the validity of the sensor signal S is evaluated through the control unit 28 with the help of at least one evaluation parameter. The control unit 28 in this case evaluates the extent to which the sensor signal S can be utilized for a reliable control of the working section 22 and/or of the working device 24. The validity should be understood as the validity or accuracy of the sensor signal S. Thus, a very high validity of the sensor signal S is given in the case that working rows 16 are exclusively detected and depicted in the field of view 32 of the optical sensor unit 30.

If, by contrast, the number of the detected and depicted interference rows 18 increases, for example, when the agricultural working machine 10 approaches the optical sensor 30, the sensor signal S is evaluated with a low validity since the sensor signal S for the control of the working section 22 and/or working device 24 becomes increasingly inaccurate because of the increasing component of interference rows 18. Thus, the control unit 28 takes into account a sensor signal S with a low validity to a lesser degree and consider further signals, for example, from a navigation system, to a greater degree for the control. On undershooting an adjustable limit value of the validity, the sensor signal S is completely disregarded and/or the optical sensor unit 30 can be switched off in order to avoid faulty controlling of the working section 22 and/or working device 24.

The at least one evaluation parameter for evaluating the validity of the sensor signal S is a parameter that exerts influence on the validity or accuracy of the sensor signal S. Evaluation parameters can be, for example, an adequate optical contrast between the row culture 14 and the ground, gaps in the working rows 16, the size of the distances between the working rows 16, the spatial arrangement of the working rows 16 and/or interference rows 18, for example. Preferably, a distance d between the optical sensor unit 30 and an interference row 18 and/or an end of a working row 16 is employed as evaluation parameter for evaluating the validity of the sensor signal S.

The agricultural machine 10 shown in Fig. with the attached implement, 12 is moved in travelling direction 20 along the working rows. 16, while the working machine 10 approaches interference rows 18 which Can represent a headland. On the working section 22 of the implement 12, the optical sensor unit 30 is arranged on the in travelling direction 20 left side facing the interference rows, the field of view 32 of which detects the first interference row 18. In the representation, the distance between the optical sensor unit and the end of a working row 16 substantially corresponds to the distance between the optical unit 30 and the closes interference row 18.

The optical sensor unit 30 and the closest interference row 18 are spaced by a distance d along a working row 16. Along each working row 16, the distance d is determined between the optical sensor 30 and an interference row 18 and/or an end of the respective working row 16. The further the machine 10 moves on in travelling direction 20, the smaller the distances d become, in the field of view 32 of the optical sensor unit 30, along, the working rows 16 and the fewer working rows 16 are available for generating a valid sensor S, as a result of which the validity of the sensor signal S likewise decreases with decreasing distances. Thus, the validity of the sensor signal S can be evaluated through the distance d as evaluation parameter.

For the distance d, a limit distance $d_G$ can be adjusted by an operator of the machine 10, with which the distance d is continuously compared. The limit distance $d_G$ is stored in a memory in the control unit 28. On reaching the limit distance $d_G$ along a working row, or in the mean of all working rows 16 detected by the optical sensor 30, the sensor signal S is evaluated by the control unit 28 with a low validity or is disregarded for the control. A plurality of in particular stepped limit distances $d_g$ also can be adjustable, wherein each limit distance $d_G$ can correspond to another validity. For example, the validity of the sensor signal S can be correspondingly decreased with decreasing limit distances $d_e$.

In addition, in the case of a very low validity or a negligible sensor signal S, the optical sensor unit 30 is switched off in order to avoid faulty controlling because of the influence of the interference rows 18 on the sensor signal S. Thus, the control unit 28, in the case that only a single optical sensor unit 30 is present, can fix the control of the working section 22 and/or working device 24 in the case of too low a validity of the sensor signal S, so that the working rows 16 can be finish-worked free of defects.

Figure 2:
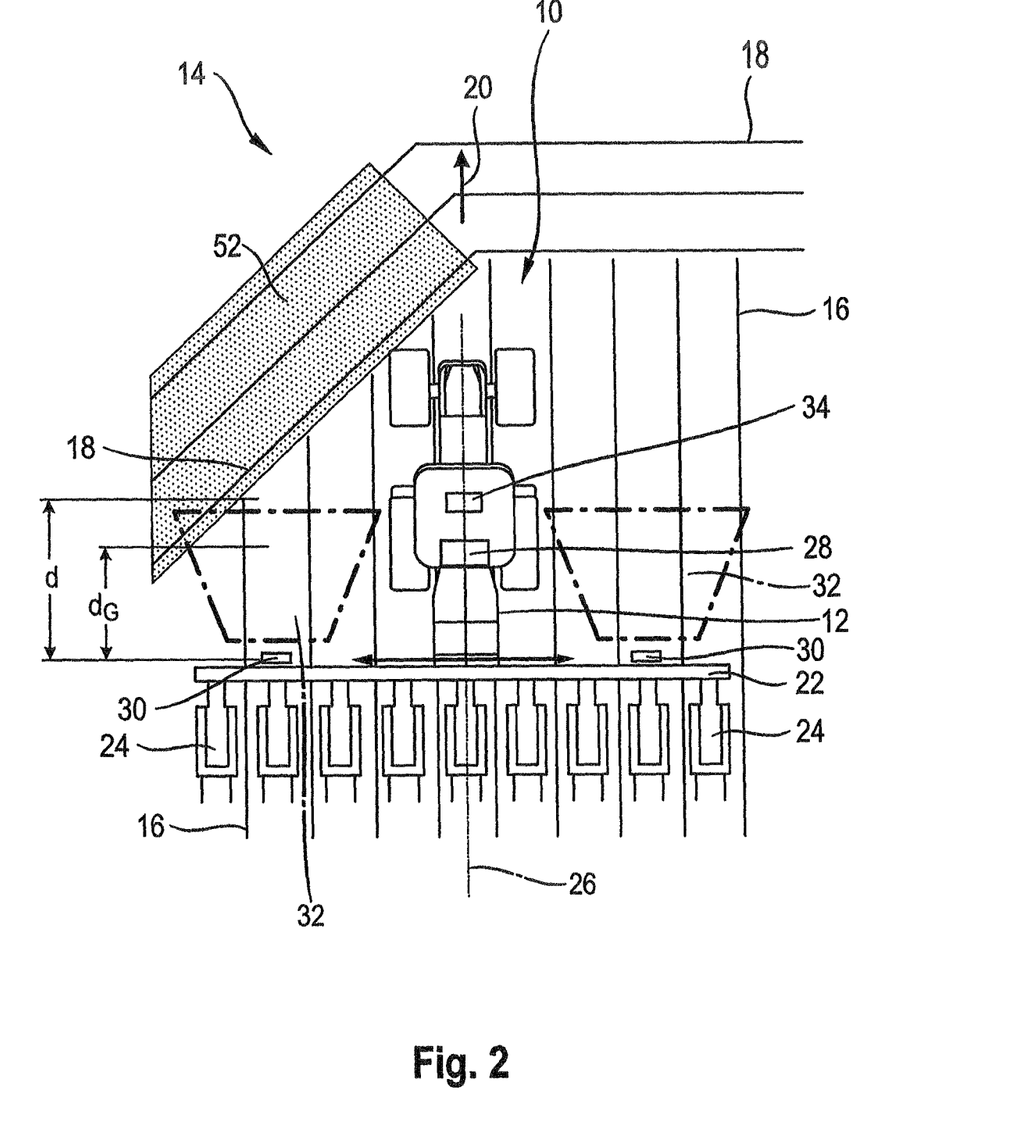
FIG. 2: presents a schematic top view of a machine having a moveable working section and two optical sensor units.

FIG. 2 shows an agricultural machine 10 with an implement 12, which comprises a working section 22 that are transversely to the longitudinal axis 26 of the machine 10. On the working section 22, two optical sensor units 30 are arranged next to a plurality of working devices 24, on each side of the longitudinal axis 26. The field of view 32 of the respective sensor units 30 in travelling direction 20 is directed towards the front, wherein in each case a part region of the row culture 14 is detected and depicted.

The machine 10 is moved in travelling direction 20 along a plurality of working rows 16 and approaches interference rows 18, which, for example, constitute a headland. On the left side of the longitudinal axis 26 of the machine 10, the interference rows 18 are arranged at an angle that is smaller than 90° to the working rows 16 and in a region on the right-hand side at an angle of approximately 90° to the working rows 16. Consequently, the working machine 10 and the left-hand side optical sensor unit 30 approach the interference rows 18 faster on the left-hand side than on the right-hand side, so that the distance d of the optical sensor unit 30 which is arranged on the left-hand side of the longitudinal axis 26 decreases before the distance d of the optical sensor unit 30 arranged on the right-hand side. Owing to the arrangement of the interference rows 16, the distance d initially decreases along the working row 16 located furthest, in this case left-hand, outside.

The control unit 28 receives a sensor signal S each from the optical sensor units 30, which can be used for controlling the working section 22 and/or working device 24. The sensor unit 30 arranged on the left-hand side of longitudinal axis 26 generates a sensor signal $S_1$ and the sensor unit 30 arranged on the right-hand side may generate a sensor signal $S_2$. For this purpose, the control unit 28 initially evaluates the validity of the sensor signals $S_{1,2}$ of the sensor unit 30 arranged on the left-hand side and right-hand side, wherein on reaching a preadjustable limit distance $d_G$ between an optical sensor unit 30 and an interference row 18, a sensor signal $S_{1,2}$ with a low validity is evaluated or be entirely disregarded for the control.

In the situation shown in FIG. 2, the limit distance $d_G$ of the left optical sensor unit 30 would be initially undershot, so that the sensor signal $S_1$ of the left optical sensor unit 30 is evaluated with a lower validity than the sensor signal $S_2$ of the right optical sensor unit 30. The control unit 28, therefore, would put more weight on the right sensor signal $S_2$ or utilize right sensor signal $S_2$ exclusively for controlling the working section 22. Accordingly, in the case of more than two sensor signals S, the control unit 28 can put less weight on the low-evaluated sensor signals S for controlling or disregard them entirely. On undershooting the limit distance $d_G$ in the case of both optical sensor units 30, the control unit 28 can disregard both control signals $S_{1,2}$ and fix the control and/or the working section 22 until the working devices 24 reach the interference rows 18 or the ends of the working rows 16 and are correspondingly deactivated by the control unit 28.

The optical sensor unit 30 also can hide or exclude a region 52 that is arranged further distant from the sensor unit 30 than the limit distance $d_G$, disregarding the further distant region 52 for the generation of the sensor signal S, of the sensor signals $S_{1,2}$. The hidden region 52 can extend along the interference rows 18, for example, in the form of a headland. Through the hidden region 52, the influence of the interference rows 18 on the sensor signal S can be reduced. With increasing approach of the limit distance, the hidden region 52 can become continuously larger and the depicted region of the field of view 32 used for the sensor signal S can become continuously smaller so that the image information that is available for generating the sensor signal S becomes ever less so that the validity of the sensor signal S likewise decreases with decreasing distance.

The sensor signals $S_{1,2}$ of the two optical sensor units 30 can be fused into one sensor signal $S_T$ after their respective evaluation by the control unit 28, on the basis of which the control unit 28 can control the working section 22. In addition, a plurality of in particular evaluated sensor signals S of a corresponding number of optical sensor units 30 also can be fused into a single sensor signal $S_T$. Here, the evaluated sensor signals $S_V$ can for example be averaged, while sensor signals $S_V$ with a validity below a limit value can be disregarded.

The agricultural machine 10 can comprise a satellite-supported navigation system 34, which is connected to the control unit 28. The navigation system 34 may be used for route planning and/or automatic control of the agricultural machine 10. Furthermore, the navigation system 34 can transmit position signals P for the position-dependent control of the working devices 24 for working the row culture 14 to the control unit 28. Because of this, the working devices 24 can be activated or deactivated individually or in groups dependent on position in a so-called section control. In the navigation system 34, position data, at least regarding the row culture 14 to be worked, is stored.

The stored data are position information regarding a spatial arrangement of working rows 16, interference rows 18 and/or ends of the working rows 16. By comparing the current position with the stored data regarding the row culture 14, the navigation system 34 can transmit a position signal P to the control unit 28, from which the distance d of an optical sensor unit 30 to an interference row 18 along a certain working row 18 is determined. The distance d in this case is measured perpendicularly to the working section 22 along one or a plurality of working rows 16 in each case. Here, the distance d of an optical sensor unit 30 to an interference row 18 can be equal to the distance d of the working section 22 to the interference row 18.

To increase the accuracy in determining the distance d, the geometrical configuration and the arrangement of the optical sensor unit 30 and of the working devices 24, is stored in the control unit 28. The distance d between an optical sensor unit 30 and an interference row 18 and/or the end of a working row 16 also is determined with the optical sensor unit 30, for example, in the form of a 3-D camera to provide spatial distance data to objects in its field of view 32. The control unit 28 also can determine a length of the respective working rows 16 and/or distances d from data regarding the respective activation of the working devices 24, for example, the position in which these are to be activated and deactivated, stored in the control unit 28.

Figure 3:
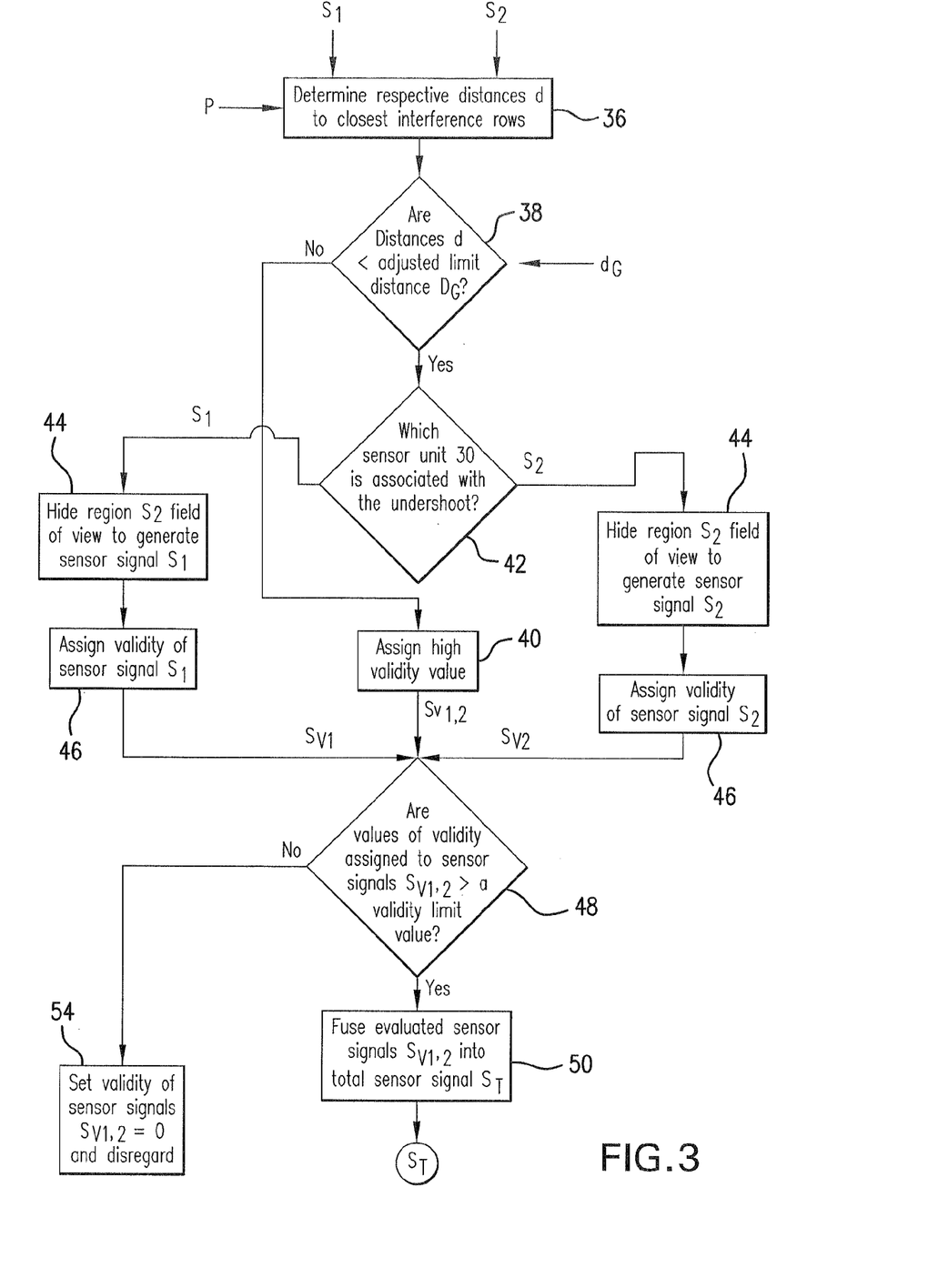
FIG. 3: presents a flow diagram, which exemplarily illustrates the evaluation of the validity of two sensor signals.

FIG. 3 presents a flow diagram illustrating the evaluation of the validity of two sensor signals $S_{1,2}$. The sensor signals $S_{1,2}$ in this case originate from two optical sensor units 30 shown in FIG. 2, wherein the optical sensor unit 30 arranged on the left-hand side in the travelling direction generates the sensor signal $S_1$ and the optical sensor unit 30 arranged on the right-hand side may generate the sensor signal $S_2$. The evaluation of the validity of a sensor signal S takes place using distance d as evaluation parameter, in order to generate an evaluated sensor signal $S_V$. The distance d in this case is determined by at least one position signal P provided by the navigation system 34 based on the current position and stored information.

In a first event step 36, the respective distance d between an optical sensor unit 30 and the ends of the working rows 16 located in front of it and/or the interference rows 18, in particular, of the closest interference row 18, is determined from the at least one position signal P for evaluating the validity of the sensor signals $S_{1,2}$. In a following first decision step 38, the determined distances d along the working rows 16 under consideration are each compared with at least one preadjusted limit distance $d_G$.

If no distance d is smaller than the adjusted limit distance $d_G$, each sensor signal $S_{1,2}$ can each be assigned a corresponding high value of the validity in a second event step 40. Here, a high validity of the sensor signal $S_{1,2}$ may be assumed if the risk of a defective control of the working section 22 may be considered low because of the determined distances to interference rows 18 and/or ends of the working rows 16. In addition, further evaluation parameters, for example the optical contrast between the recognised working rows 16 and the ground can be utilized for evaluating the validity of the sensor signals $S_{1,2}$, in order to take into account further influences on the validity of a sensor signal S.

If by contrast the adjusted limit distance $d_G$ is undershot by one of the determined distances d, the sensor unit 30 which is assigned the determined distance d which undershoots the limit distance $d_G$ is determined in a second decision step 42. This is determined by determining the optical sensor unit 30 which is assigned the field of view 32, in which the respective working row 16 is arranged, along which the distance d is smaller than the limit distance $d_G$.

In the example shown in FIG. 2, the limit distance $d_G$ is initially not undershot along any of the working rows 16 detected by the optical sensor units 30. However, if the machine 10 is moved further in travelling direction 20, the distance d along the working row 16 arranged on the left outside will first undershoot the limit distance $d_G$, which is in the field of view 32 of the left optical sensor unit 30. It can thus be determined that the sensor signal $S_1$ of the left optical sensor unit 30 is affected.

In a third event step 44, the optical sensor unit 30 (for example, in FIG. 2 the left sensor unit 30), may hide the region 52 field of view 32 for generating the sensor signal $S_1$, which is in the region of the detected interference rows 18 or on the other side of the limit distance $d_G$, in order to avoid interfering influences of the interference rows on the control of the working section. However, the image of the row culture used for generating the sensor signal $S_1$ of this optical sensor 30 is reduced in size because of this, as a result of which the validity of the corresponding sensor signal $S_1$ is reduced. Because of the fact that the working machine 10 is moved on, the utilisable image in the field of view 32 of the optical sensor unit 30 is reduced further, so that the validity of the sensor signal $S_1$ likewise further decreases. The value of the validity of the affected sensor signal $S_{1,2}$ is assigned to the sensor signal $S_{1,2}$ in a fourth event step 46, in order to generate an accordingly evaluated sensor signal $S_{V1,2}$, while with a decreasing distance d the value of the validity may decrease.

In a third decision step 48, the values of the validity assigned to the sensor signals $S_{V1,2}$ are compared with a validity limit value. If the validity limit value is undershot by an evaluated sensor signal $S_{V1,2}$, the validity of this sensor signal $S_{V1,2}$ is set equal to zero in sixth event step 54, as a result of which this sensor signal $S_{V1,2}$ is disregarded by the control unit for controlling the working section. The evaluated sensor signals $S_{V1,2}$, which have a greater validity than the validity limit value, are fused into a single total sensor signal $S_T$ in a fifth event step 50. The sensor signals $S_{V1,2}$ may be averaged into a total sensor signal $S_T$ for the control taking into account their respective validity.

In addition, a cross track error, which in particular in each case may be determined by the optical sensor units 30, is additionally taken into account for generating a control signal S, $S_V$ in the fifth event step 50. To this end, the product with the corresponding validity of the sensor signal $S_V$, for example, from the sensor signals $S_{1,2}$, may be formed from each of the determined cross track errors. Owing to the validity limit value, cross track errors, which are assigned to a sensor signal $S_V$ with low validity, are disregarded by the control. The fused sensor signal $S_T$ so generated serves as basis for controlling the working section 22 and/or working devices 24 along the working rows 16 for the control unit 28.

Figure 4:
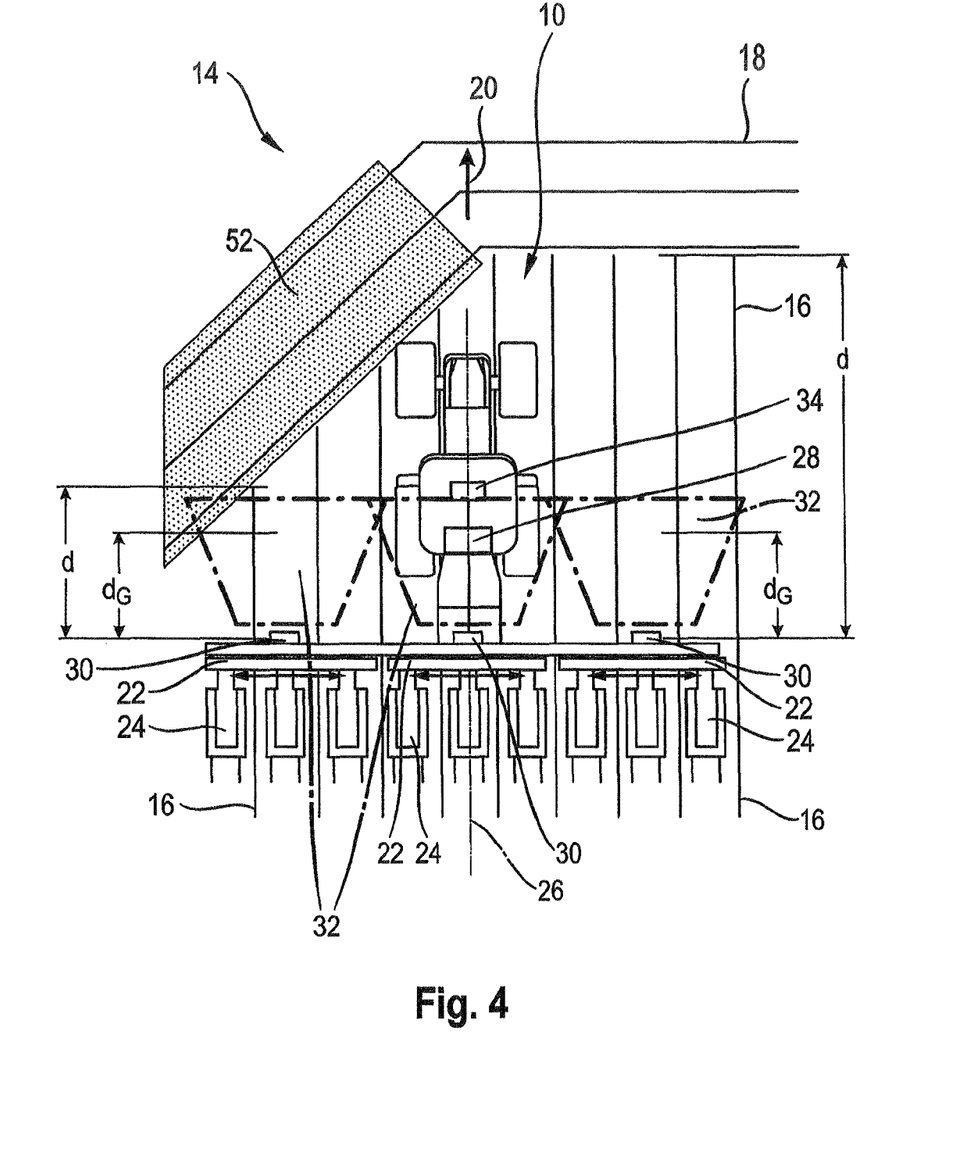
FIG. 4: presents a top view of a machine having three working sections with an optical sensor unit each.

FIG. 4 shows an agricultural machine 10 with three individually moveable working sections 22, wherein on each working section 22 an optical sensor unit 30 is arranged. Here, each optical sensor unit 30 generates a sensor signal S, for example, the sensor signals $S_1$, $S_2$ and $S_3$, for controlling each respective working section 22, on which it is arranged. The sensor signals S of the three optical sensor units 30 are partly and/or jointly utilized by the control unit 28 for controlling individual and/or all working sections 22 and/or working devices 24. Because of this, a reliable sensor signal $S_T$ for the control is generated by the remaining two sensor units 30 and their evaluated sensor signals $S_V$, for example, sensor signals $S_{V2,3}$, when the validity of a sensor signal S of a sensor unit 30, for example, sensor signal $S_1$, is reduced.

Figure 5:
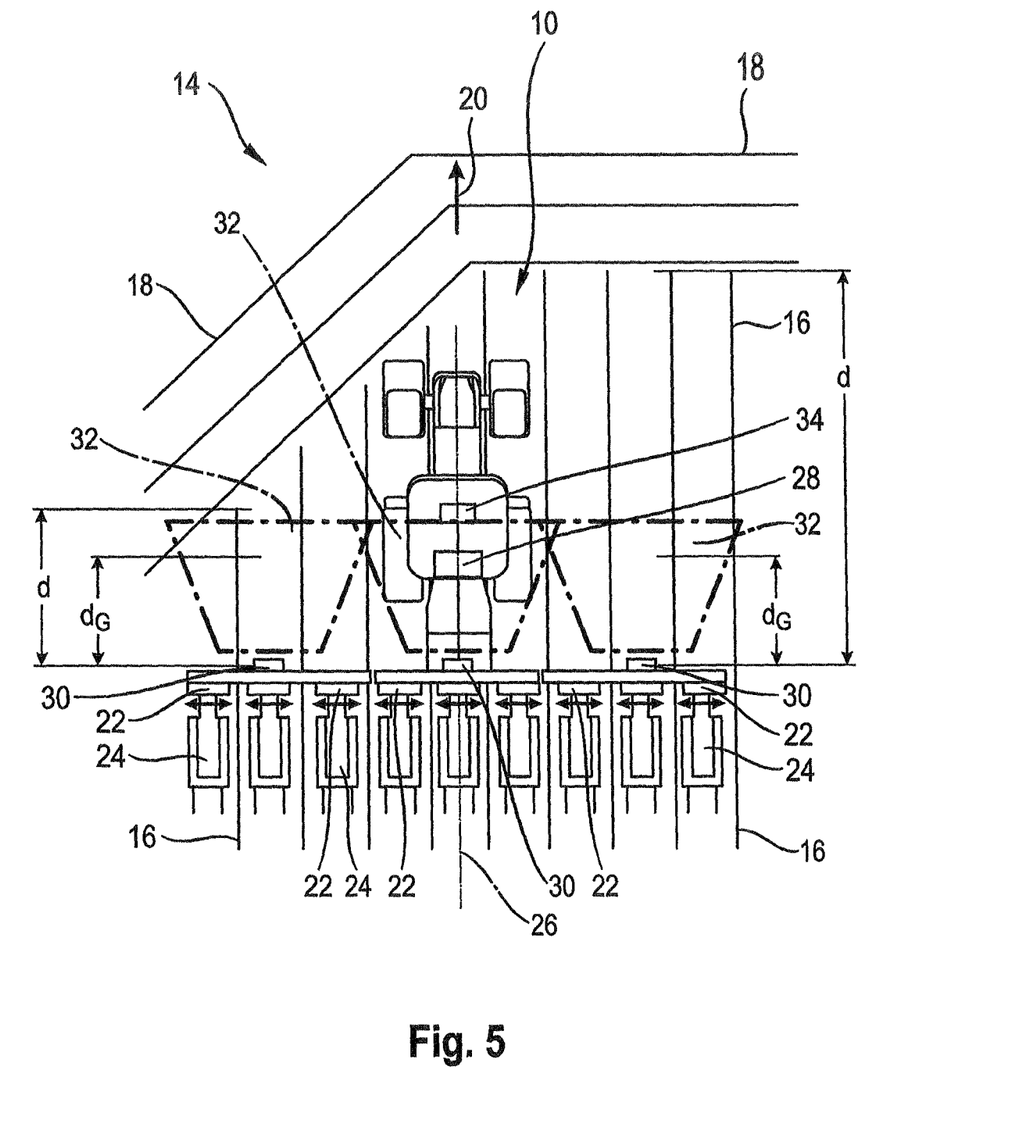
FIG. 5; a top view of a machine having three optical sensor units and more than three moveable working sections.

An arrangement of a working device 24 each on a working section 22 is shown in FIG. 5. The working devices 24 are individually controllable along a working row 16 because of this, as a result of which a more precise working of the row culture 14 can be achieved. The control is effected via the control unit 28, which is connected to three optical sensor units 30, which generate a sensor signal 8 each (which control unit 28 could alternatively be positioned on one of the working sections). The sensor signals $S_{1,2,3}$ of the optical sensor units 30 may be used individually or combined for controlling certain or all working sections 22 and/or working devices 24.

LIST OF REFERENCE CHARACTERS

10 Agricultural machine
12 Implement
14 Row culture
16 Working row
18 Interference row
20 Travelling direction
22 Working section
24 Working device
26 Longitudinal axis
28 Control unit
30 Optical sensor unit
32 Field of view
34 Navigation system
36 Event step 1
38 Decision step 1
40 Event step 2
42 Decision step 2
44 Event step 3
46 Event step 4
48 Decision step 3
50 Event step 5
52 Hidden region
S Sensor signal
$S_V$ Evaluated sensor signal
$S_T$ Control sensor signal
d Distance
$d_G$ Limit distance
P Position signal As will be evident to persons skilled in the art, the foregoing detailed description and figures are presented as examples of the invention, and that variations are contemplated that do not depart from the fair scope of the teachings and descriptions set forth in this disclosure. The foregoing is not intended to limit what has been invented, except to the extent that the following claims no limit that.

What is claimed is:

1. An agricultural machine with an implement for working a row culture that substantially comprises working rows arranged parallel to one another, interference rows arranged at an angle to the working rows or both, the implement comprising:
    at least one controllably moveable working section with at least one activatable working device for working the row culture;
    a control unit for controlling the working section, the at least one activatable working device or both relative to at least one working row;
    a first optical sensor unit connected wired or wirelessly to the control unit for generating an image of at least one part of the row culture, from which image a first sensor signal (S1) is generated for controlling the working section, the at least one activatable working device, or both; and
    a navigation system in communication with the control unit that generates and provides a position signal to the control unit representing a current position of any of the agricultural machine, the working section and the at least one activatable working device;
    wherein the control unit is configured to evaluate a validity of the generated first sensor signal (S1) to determine an extent to which the evaluated first sensor signal (S1) is utilizable for controlling the working section, the at least one activatable working device or both, based on at least one evaluation parameter; and
    wherein, if the first sensor signal (S1) is determined not to be utilizable for controlling the working section, the at least one activatable working device or both, the first sensor signal (S1) is disregarded or used to a lesser degree than the position signal.

2. The agricultural machine according to claim 1, wherein the at least one evaluation parameter is a distance (d) between the first optical sensor unit and any of the group consisting of at least one of the interference rows, at least one end of a working rows or both.

3. The agricultural machine according to claim 2, wherein for evaluating the sensor signal (S), a limit distance ($d_G$) between the first optical sensor unit and the at least one of the interference rows, the end of a working rows or both is adjustable.

4. The agricultural machine according to claim 1, wherein the control unit evaluates a distance-dependent part region of the image of the row culture.

5. The agricultural machine according to claim 2, wherein the position signal provides a basis for determining the distance (d) between the first optical sensor unit and the at least one of the interference rows, the end of at least one of the working rows or both.

6. The agricultural machine according to claim 2, wherein the first sensor signal (S1) provides a basis for determining the distance (d) between the first optical sensor unit and the at least one of the interference rows, the end of at least one of the working rows or both.

7. The agricultural machine according to claim 2, further comprising a second optical sensor unit for generating a second image of the at least one part of the row culture, from which second image a second sensor signal (S2) is generated, wherein the first and second sensor signals (S1, S2) are utilized individually or in combination for controlling the working section, the working device or both.

8. A method for controlling at least one controllably moveable working section, at least one activatable working device or both of an implement of an agricultural machine for working a row culture having working rows arranged parallel to one another, interference rows arranged at an angle to the working rows or both, the implement further comprising a control unit for controlling the working section, the at least one activatable working device or both relative to at least one of the working rows and a first optical sensor unit connected to the control unit for generating an image of at least one part of the row culture, from which image a first sensor signal (S1) for controlling the working section, the at least one activatable working device or both is generated, comprising:

determining a current position of any of the agricultural working machine, the first optical sensor unit and the at least one activatable working device, generating a position signal based the current position and communicating the position signal to the control unit;

evaluating, using the control unit, a validity of the first sensor signal (S1) for determining an extent to which the evaluated first sensor signal (S1) is utilizable for controlling the working section, the working device or both, based on at least one evaluation parameter; and if the first sensor signal (S1) is determined not to be utilizable for controlling the working section, the at least one activatable working device or both, disregarding the first sensor signal (S1) or using the first sensor signal (S1) to a lesser degree than the position signal.

9. The method according to claim 8, wherein the step of evaluating the first sensor signal (S1) is based on a distance (d) between the current position of the first optical sensor unit and any of the group consisting of: at least one the interference rows, at least one end of the working rows or both.

10. The method according to claim 8, wherein the step of evaluating the first sensor signal (S1) includes adjusting a limit distance ($d_G$) between the first optical sensor unit and any of the group consisting of: at least one the interference rows, at least one end of the working rows or both.

11. The method according to claim 8, wherein the step of evaluating includes evaluating a distance-dependent part region of the image of the row culture.

12. The method according to claim 9, further comprising determining the distance (d) between the current position of the first optical sensor unit and the at least one of the interference rows, the at least one end of the working rows or both using a navigation system, using the first optical sensor unit or both.

13. The method according to claim 8, wherein the implement includes a second optical sensor unit for generating a second image, from which second image a second sensor signal (S2) is generated; and wherein the step of evaluating includes evaluating the second sensor signal (S2) includes processing the evaluated signals (S1, S2) individually or in combination for controlling the at least one working section, the working device or both.

* * * * *